United States Patent Office 2,711,985
Patented June 28, 1955

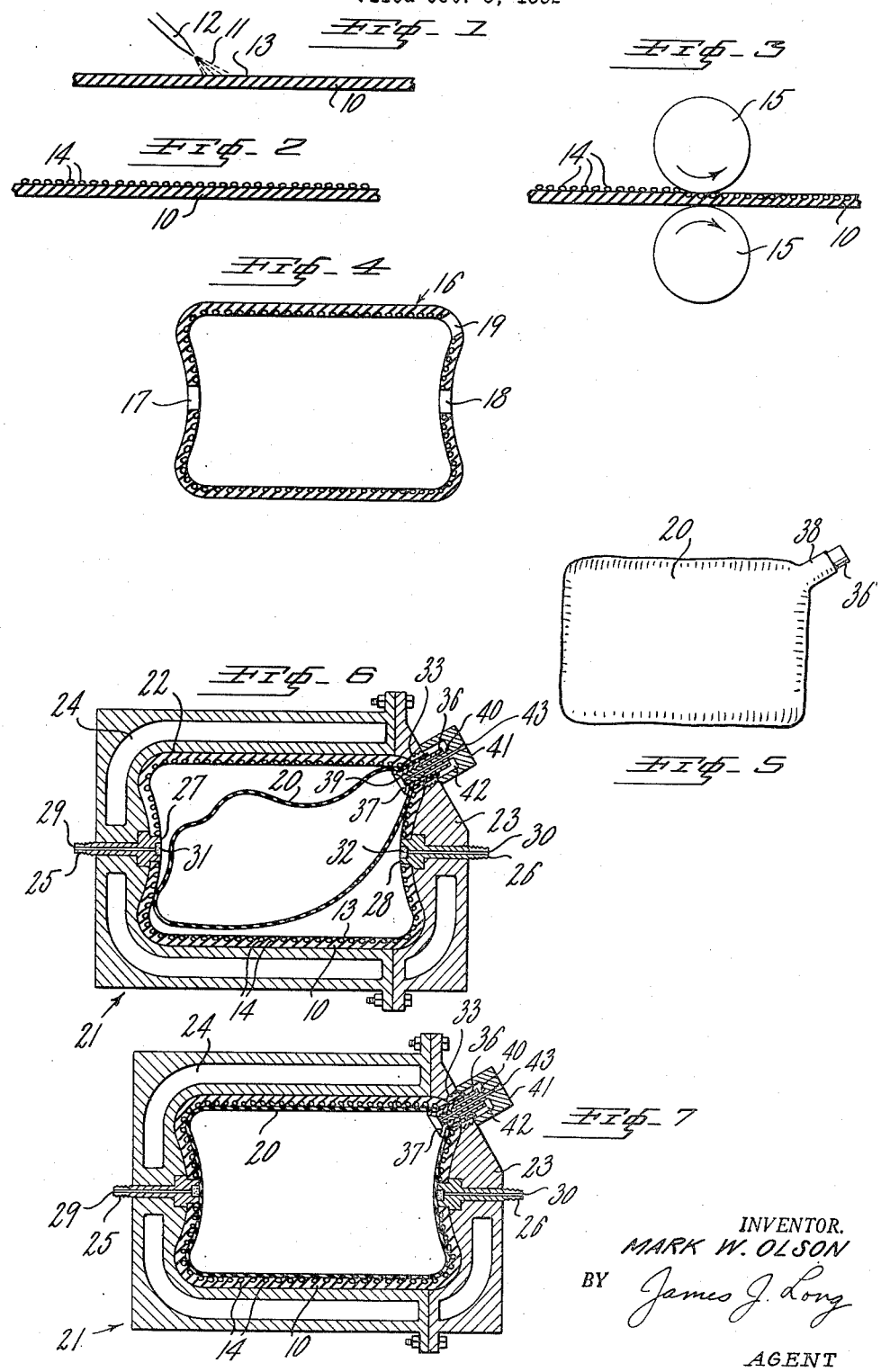

2,711,985

PROCESS FOR BONDING POLYETHYLENE TO BUTYL RUBBER

Mark W. Olson, Allendale, N. J., assignor to United States Rubber Company, New York, N. Y., a corporation of New Jersey Application October 3, 1952, Serial No. 312,916

7 Claims. (Cl. 154—122)

This invention relates to a process for adhering polyethylene to Butyl rubber compositions, and, more particularly, it relates to a method of bonding polyethylene to Butyl rubber involving penetrating the surface of the Butyl rubber with polyethylene while the Butyl rubber is in an uncured state, and thereafter adhering a desired polyethylene body to the thus-treated Butyl surface.

A demand has been expressed for composite products made up of polyethylene laminated or adhered to Butyl rubber, either alone or in admixture with other materials. Certain of these products, because of their shape, or because of other considerations, must be "air-cured" (as distinguished from curing under positively applied mechanical pressure, as in a press) before the polyethylene is attached.

It is general knowledge that polyethylene is compatible with Butyl rubber, and that it will adhere to Butyl better than to other types of rubber. Thus, tests have shown that a fair bond can be obtained by holding polyethylene and uncured Butyl rubber surfaces in intimate contact while the rubber is being cured. I have also obtained a fair bond by pressing a heated sheet of polyethylene against a press-cured sheet of Butyl rubber. However, an unsatisfactory bond results if the Butyl rubber is air-cured prior to attempting the bonding operation. If it is attempted to adhere polyethylene to the Butyl rubber after such an air cure, great difficulty is experienced, and only the poorest bonds, that are totally unsatisfactory for most purposes, can be obtained.

It is a principal object of the present invention to provide an improved method of bonding polyethylene to Butyl rubber compositions, especially Butyl rubber that has been previously cured, and more especially Butyl rubber compositions that have been previously air-cured.

I have discovered a new method of adhering polyethylene to Butyl rubber that makes it possible to obtain an excellent bond between the polyethylene and the Butyl composition, even when the Butyl has previously been air-cured. According to the invention, the Butyl rubber surface which is to be adhered or laminated to the polyethylene is first penetrated, while the Butyl is in the uncured state, with a small amount of polyethylene. From this point I proceed in either of two ways. According to one method the Butyl rubber is then cured with this polyethylene embedded in its surface, and, thereafter a polyethylene body, such as a sheet of polyethylene, is laminated to the cured Butyl surface containing the embedded polyethylene with the aid of moderate heat and pressure. According to the other method, the pressing of the polyethylene sheet against the Butyl rubber surface and the curing of the Butyl rubber are performed simultaneously. By either procedure the resulting composite laminate of Butyl rubber and polyethylene is found to be exceptionally well bonded.

Various objects and advantages of the invention will be made manifest in the following detailed description, which is intended to be read with reference to the accompanying drawing, wherein:

Fig. 1 is a diagrammatic sectional view of a portion of a sheet of uncured Butyl rubber being treated on one surface in accordance with one method of carrying out the invention;

Fig. 2 is a similar view of the Butyl rubber sheet of Fig. 1 having particles of polyethylene applied thereto;

Fig. 3 is a similar diagrammatic view showing the particles of polyethylene being pressed into the prepared surface of the Butyl rubber sheet by means of pressure rollers;

Fig. 4 is a sectional elevational view of a cured rubber drum or barrel fabricated from the prepared Butyl rubber sheet;

Fig. 5 is a side elevational view of a polyethylene bag intended to serve as a liner for the rubber barrel or drum;

Fig. 6 is a view similar to Fig. 4, showing the polyethylene liner being inserted into the cured Butyl barrel or drum contained within a suitable enclosing chamber; and, Fig. 7 is a similar view showing the polyethylene liner being united to the prepared Butyl surface.

In carrying out the invention I incorporate the polyethylene in the Butyl surface in conjunction with a softening agent for the Butyl rubber, in order to make the Butyl receptive to the polyethylene. Such softening agent may comprise any organic liquid that is known to have a solvent or softening action on raw Butyl. Among the known organic liquids of this nature may be mentioned naphtha, gasoline, diisobutylene, benzene, toluene, carbon tetrachloride, etc.

In the preferred practice of the invention the solvent or softening agent for the Butyl rubber is first applied as such to the raw Butyl surface, by any suitable method, such as spraying or brushing. Thus, referring to the drawing, and in particular to Fig. 1, a sheet 10 of raw vulcanizable Butyl rubber stock may be treated by directing a spray 11 of naphtha, from a suitable spray nozzle 12 onto one surface 13 of the Butyl sheet. A relatively small amount of naphtha is suitable for this purpose, since it is necessary to provide only sufficient solvent to wet and soften the surface, and softening occurs in a few seconds.

A quantity of polyethylene, preferably in the form of small discrete particles 14, such as polyethylene powder of such size that it passes a 40 mesh screen, is sprinkled onto the still-wet surface 13 of the solvent-softened Butyl rubber, as indicated in Fig. 2. The polyethylene particles 14 are preferably sprinkled on the surface as uniformly as possible. The amount of polyethylene applied in this manner may vary considerably for purposes of the invention, but it may be stated by way of non-limiting example that about 1 gram of polyethylene powder per square foot of the Butyl surface gives satisfactory results.

The polyethylene particles 14 are thereafter incorporated or embedded within the surface 13 of the Butyl by pressing or rubbing them into the surface. A convenient way to accomplish this is to pass the Butyl sheet 10 through the nip of a pair of suitable pinch rolls or calendar rolls 15. The pressure exerted on the polyethylene particles 14 in this manner is sufficient to force the particles into the surface 13 that has been made receptive by application of the solvent. The solvent has two effects, in that it not only softens the Butyl so that the polyethylene particles can be pressed in, but it reduces the "nerve" of the Butyl, so that it is relatively "dead," and the particles of polyethylene do not tend to pop out, but remain embedded. In accordance with a less preferred practice of the invention the polyethylene and solvent may be applied simultaneously. For example, a solution of polyethylene in hot toluene may be painted on the surface of the raw Butyl.

The Butyl rubber, having had its surface treated with the polyethylene, is now essentially ready to be cured. Usually the treated Butyl rubber will be fabricated into some particular desired shape, with or without other structural components that will make up the final composite article of Butyl rubber and polyethylene. Thus, for example, the Butyl rubber sheet 10 may be fabricated into a rubber drum or barrel of the kind disclosed in copending application of Marion M. Cunningham, Serial No. 131,407, filed December 6, 1949, now Patent No. 2,612,924, by methods that are fully described in the said application. Such barrels are generally constituted of a plurality of layers of rubberized cord fabric. They are generally essentially cylindrical in shape, much like an ordinary steel or wooden drum or barrel, with inwardly dished ends. In Fig. 4, such a rubber barrel 16 is shown in a cured state, with openings 17, 18 formed in each of its end faces, as well as an additional opening 19 at one shoulder. The inner layer of the barrel 16 is made up of a Butyl rubber composition 10 prepared as previously described and having polyethylene particles 14 embedded in its surface 13, which forms the interior surface of the barrel. The ultimate object is to provide the barrel 16 with an interior liner 20 of polyethylene, firmly adhered to the interior Butyl surface of the barrel, as shown in Fig. 7, such polyethylene liner being conveniently previously prepared in the form of a sack or bag 20 of thin polyethylene film, as indicated in Fig. 5, by methods which are well known.

Referring to Fig. 6, the rubber barrel 16 is disposed within a suitable receptacle 21 that defines an interior cavity 22 having the shape of the external contour of the barrel. The receptacle 21 is provided with a removable end portion 23 to permit insertion and removal of the barrel. The receptacle 21 may be the vessel in which the rubber barrel 16 was originally vulcanized, and has hollow walls providing fluid receiving spaces 24, which may be supplied with a suitable heating fluid such as hot oil or steam. At each end of the receptacle 21, there are provided vacuum fittings 25, 26 each having reduced inner end portions 27, 28, respectively that extends snugly into the end openings 17, 18, respectively, of the barrel 16 when the barrel is in place in the receptacle 21. Each of the fittings 25, 26 is adapted to receive a vacuum hose (not shown) at its exteriorly projecting end, in order that suction may be applied to the interior of the barrel, through passageways 29, 30, respectively, extending through the fittings, to withdraw all air from between the interior surface 13 of the barrel and the polyethylene liner bag 20. The inner face of each of the fittings 25, 26 is provided with a porous plug 31, 32 that serves to prevent the polyethylene liner from entering into the passageway 29, 30 of the fittings when suction is applied. The receptacle 21 is also provided with a shoulder opening 33, corresponding to the shoulder opening 19 of the barrel 16.

Preparatory to inserting the liner 20 into the interior of the barrel 16, a tubular fitting 36, provided with an outwardly extending flange 37 at its inner end, is disposed within a neck 38 extending from one end of the polyethylene bag 20. The tubular fitting 36 is intended to ultimately become a permanent part of the barrel assembly. A threaded portion 39 of the interior of the tubular fitting is threaded onto an axially extending correspondingly threaded shank 40 of a pressure nut 41 that is provided with an interior annular recess 42 into which the outer end of the tubular fitting 36 is free to extend. The assembly, including the liner 20, is adapted to be inserted through the shoulder opening 19 of the rubber drum 16, as indicated in Fig. 6, and the arrangement is such that as the pressure nut 41 is tightened against the exterior surface of the receptacle 21, the flange 37 of the tubular fitting 36 presses the neck area of the polyethylene bag 20 and the edge area of the drum 16 around the opening 19 into firm pressure-sealing engagement with the interior surface of the receptacle at the shoulder opening 33 thereof.

To unite the polyethylene liner 20 to the surface of the barrel 16, suction is applied through the passageways 29, 30 of the end fittings 25, 26 to withdraw all air from between the liner and the interior of the drum, and to thereby expand the polyethylene liner against the Butyl surface. The atmospheric pressure thereby maintains the polyethylene against the Butyl surface at a pressure of 15 pounds per square inch. The pressure nut 41 is also provided with an axial passageway 43 by means of which additional air pressure, or other desired fluid pressure, may be introduced into the interior of the liner from a detachable supply line (not shown) adapted to be threaded into the exterior end of the passageway 43. In this way moderate air pressure, e. g., 15 p. s. i. gauge pressure, may be introduced to the interior of the bag 20 to insure that the bag is pressed into firm contact with the entire interior surface 13 of the air-cured Butyl, as indicated in Fig. 7. Firm adhesion between the polyethylene liner and the Butyl surface is achieved by maintaining the pressure against the interior of the lining heating the assembly at a suitable elevated temperature for a short time. For this purpose, the assembly is preferably heated to a temperature substantially over about 230° F., and preferably of the order of at least about 260° F., but the temperature should not be so high as to cause thermal injury to the Butyl rubber. The polyethylene softens abruptly at about 230° F., and is readily workable in a wide range of temperatures above the softening temperature. Temperatures as high as 500° to 600° F. can be safely applied for a limited time.

Those skilled in the art will understand that the pressure employed in this process may be indefinitely higher than 15 pounds (e. g. 50 or even 100 pounds), consistent with the strength of the assembly being pressurized, but satisfactory results are obtained without higher pressures, and since such higher pressures are generally not convenient to apply, they are not usually used.

After removal of the pressure nut 41 the cured barrel 16 with the now integral polyethylene liner 20 may be removed from the vessel 21, the tubular fitting 36 remaining as an integral part of the completed barrel.

It has been found that by employment of the foregoing method, the polyethylene can be most firmly laminated to the Butyl surface, even when the Butyl surface has previously been air-cured. It will be understood that the cure of the barrel 16 is generally of the type known as an "air cure," that is, the interior surface of the Butyl is exposed to a fluid atmosphere, generally air, as opposed to being pressed against a platen or mold surface by positive mechanical pressure during the cure. Air-cured Butyl has given rise to the greatest difficulty with respect to adhesion to polyethylene, and it is decidedly more difficult to obtain a good bond between air-cured Butyl and polyethylene than it is between press-cured Butyl and polyethylene. Thus, adhesion of the order of 15 to 18 pounds per inch of width are readily obtainable by the present method, whereas it has not been possible, insofar as the inventor is aware, to obtain by other methods bonds greater than about 2.6 pounds against an air-cured Butyl rubber surface.

Although it is not desired to limit the invention to any particular theory of operation, one explanation that has been advanced for the superior adhesion obtained is that penetration of the initial application of polyethylene powder into the Butyl rubber effectively increases the bonding area, and hence enhances the strength of the bond between the treated Butyl rubber surface and the subsequently applied polyethylene layer. The benefits of the procedure of the invention appeared to be peculiar to Butyl rubber compositions, since only a slight bond was obtained between a cured natural rubber surface and polyethylene, even though the rubber was treated with polyethylene powder prior to cure as described above.

Because it provides good adhesion, even when the Butyl is air-cured, the present invention finds particular application in conjunction with the fabrication of complex articles, or articles of unusual shape, that cannot be readily press-cured, or cured in a mold. The invention is particularly advantageous in connection with fabrication methods wherein it is not desirable or possible to have the polyethylene portion of the desired composite article in contact with the Butyl rubber portion at the time that the Butyl rubber is cured. The term "Butyl rubber" is used herein in its ordinary sense to denote a sulfur-vulcanizable copolymer of a major proportion of an iso-olefin having from 4 to 8 carbon atoms, such as isobutylene, and a minor proportion of a multi-olefinic unsaturate having from 4 to 14 carbon atoms per molecule. The multi-olefinic unsaturate is usually an aliphatic conjugated diolefin hydrocarbon having from 4 to 6 carbon atoms per molecule, typically isoprene or butadiene. The proportions of combined monomers in the copolymer usually range from 90 to 99.5% of the isoolefin and correspondingly from 10 to 0.5% of the multi-olefinic unsaturate. The invention is equally successful whether the Butyl rubber compositions contain mainly only Butyl rubber and the necessary vulcanizing ingredients or whether the Butyl rubber is also extended or blended with other materials, especially saturated plastic materials compatible therewith, such as polyethylene, polyisobutylene, etc. Thus, for example, good results are obtained with a Butyl composition of the following type (containing additionally small amounts of curatives):

| | |
|---|---|
| Butyl rubber | 50 |
| Vistanex [polyisobutylene] | 25 |
| Polythene [polyethylene] | 25 |
| | 100 |

The purpose of the polyethylene in the foregoing composition is to make the sheet material stiffer, and hence easier to handle. Good adhesion has been obtained by the process of the invention between polyethylene sheets and sheet material made from the above mixture, even though the polyisobutylene in the mixture ordinarily makes adhesion more difficult.

Having thus described my invention, what I claim and desire to protect by Letters Patent is:

1. A method of bonding an article made of a synthetic rubbery copolymer of an isoolefin having from 4 to 8 carbon atoms with from 0.5 to 10% of an aliphatic conjugated diolefin hydrocarbon having from 4 to 6 carbon atoms per molecule to a polyethylene article comprising in combination the steps of incorporating polyethylene in the surface of the said synthetic rubbery copolymer article to be joined to the polyethylene article while the said rubber is in an uncured state, and thereafter curing the said synthetic rubbery copolymer article and holding the polyethylene article in contact with the said treated surface of the synthetic rubbery copolymer article while applying heat and pressure to the assembly to unite the synthetic rubbery copolymer article and the polyethylene article at the said surface.

2. A method of bonding an article made of a synthetic rubbery copolymer of an isoolefin having from 4 to 8 carbon atoms with from 0.5 to 10% of an aliphatic conjugated diolefin hydrocarbon having from 4 to 6 carbon atoms per molecule to a polyethylene article comprising in combination the steps of softening the surface of the said synthetic rubbery copolymer article to be joined to the polyethylene article while the said rubber is in an uncured state, incorporating polyethylene in the said surface, curing the said synthetic rubbery copolymer article, placing the polyethylene article in contact with the said surface of the synthetic rubbery copolymer article containing the incorporated polyethylene, and applying heat and pressure to unite the synthetic rubbery copolymer article and the polyethylene article at the said surface.

3. A method of bonding an article made of a synthetic rubbery copolymer of an isoolefin having from 4 to 8 carbon atoms with from 0.5 to 10% of an aliphatic conjugated diolefin hydrocarbon having from 4 to 6 carbon atoms per molecule to a polyethylene article comprising in combination the steps of softening the surface of the said synthetic rubbery copolymer article to be joined to the polyethylene article while the said rubber is in an uncured state by applying a solvent to the said surface, incorporating polyethylene in the said surface, curing the said synthetic rubbery copolymer article, placing the polyethylene article in contact with the said surface of the synthetic rubbery copolymer article containing the incorporated polyethylene, and applying heat and pressure to unite the synthetic rubbery copolymer article and the polyethylene article at the said surface.

4. A method of bonding an article made of a synthetic rubbery copolymer of an isoolefin having from 4 to 8 carbon atoms with from 0.5 to 10% of an aliphatic conjugated diolefin hydrocarbon having from 4 to 6 carbon atoms per molecule to a polyethylene article comprising in combination the steps of softening the surface of the said synthetic rubbery copolymer article to be joined to the polyethylene article by applying a solvent to the said surface, applying powdered polyethylene to the said solvent-softened surface, pressing the said polyethylene powder into the said solvent-softened surface to embed the polyethylene powder firmly in the said surface, curing the said synthetic rubbery copolymer article, placing the polyethylene article in contact with the said surface of the synthetic rubbery copolymer article containing the embedded polyethylene, and applying heat and pressure to unite the synthetic rubbery copolymer article and the polyethylene article at the said surface.

5. A method of bonding an article made of a synthetic rubbery copolymer of an isoolefin having from 4 to 8 carbon atoms with from 0.5 to 10% of an aliphatic conjugated diolefin hydrocarbon having from 4 to 6 carbon atoms per molecule to a polyethylene article comprising in combination the steps of applying a solvent to the surface of the said synthetic rubbery copolymer article to be joined to the polyethylene article while the said rubber is in an uncured state to soften the said surface, sprinkling powdered polyethylene on the said solvent-softened surface of the synthetic rubbery copolymer article, pressing the said polyethylene powder into the said solvent-softened surface to embed the said powder in the said surface, thereafter subjecting the said synthetic rubbery copolymer article to an air cure, placing the polyethylene in contact with the said surface of the air-cured synthetic rubbery copolymer article containing the embedded polyethylene, and applying heat and pressure to unite the air-cured synthetic rubbery copolymer article and the polyethylene article at the said surface.

6. A method of bonding an article made of a synthetic rubbery copolymer of an isoolefin having from 4 to 8 carbon atoms with from 0.5 to 10% of an aliphatic conjugated diolefin hydrocarbon having from 4 to 6 carbon atoms per molecule to a polyethylene article comprising in combination the steps of softening the surface of the said synthetic rubbery copolymer article to be joined to the polyethylene article while the said rubber is in an uncured state by application of a solvent to the said surface, applying powdered polyethylene to the said solvent-softened surface, air-curing the said synthetic rubbery copolymer article, holding the polyethylene article in contact with the said surface of the air-cured synthetic rubbery copolymer containing the embedded polyethylene with a pressure of at least about 15 pounds per square inch to press the polyethylene article against the said surface, while heating the assembly to a temperature above 230° to unite the synthetic rubbery copolymer article and the polyethylene article at the said surface.

7. A method of bonding an article made of a synthetic rubbery copolymer of an isoolefin having from 4 to 8 carbon atoms with from 0.5 to 10% of an aliphatic conjugated diolefin hydrocarbon having from 4 to 6 carbon atoms per molecule to a polyethylene article comprising in combination the steps of applying a solvent to the surface of the said synthetic rubbery copolymer article to be joined to the polyethylene article while the said rubber is in an uncured state to soften the said surface, applying powdered polyethylene to the said solvent-softened surface, pressing the powdered polyethylene into the said solvent-softened surface, air-curing the said synthetic rubbery copolymer article, placing the polyethylene article in contact with the said surface of the synthetic rubbery copolymer article containing the embedded polyethylene, pressing the synthetic rubbery copolymer article and the polyethylene article together at a pressure of from about 15 to 100 pounds per square inch by applying suction to the interface between the polyethylene article and the synthetic rubbery copolymer article and applying additional fluid pressure to the exposed face of the polyethylene article, and concurrently heating the assembly to a temperature above 230° to unite the synthetic rubbery copolymer article and the polyethylene article.

References Cited in the file of this patent

UNITED STATES PATENTS

| | | |
|---|---|---|
| 1,999,259 | Rozema | Apr. 30, 1935 |
| 2,078,910 | Merrill | Apr. 27, 1937 |
| 2,188,434 | Grinter | Jan. 30, 1940 |
| 2,499,134 | De Bruyne | Feb. 28, 1950 |
| 2,541,498 | Calvert | Feb. 13, 1951 |
| 2,583,387 | Morrissey et al. | Jan. 22, 1952 |
| 2,622,056 | Coudres et al. | Dec. 16, 1952 |
| 2,668,787 | Schramm | Feb. 9, 1954 |